(12) United States Patent
Mohandru et al.

(10) Patent No.: US 9,195,465 B2
(45) Date of Patent: Nov. 24, 2015

(54) CACHE COHERENCY AND PROCESSOR CONSISTENCY

(71) Applicant: Intel Corporation, Santa Clara, CA (US)

(72) Inventors: Varun K. Mohandru, Braunschweig (DE); Fernando Latorre, Barcelona (ES); Li-Gao Zei, Braunschweig (DE); Allan D. Knies, Burlingame, CA (US); Rami May, Haifa (IL); Lutz Naethke, Braunschweig (DE)

(73) Assignee: Intel Corporation, Santa Clara, CA (US)

( * ) Notice: Subject to any disclaimer, the term of this patent is extended or adjusted under 35 U.S.C. 154(b) by 132 days.

(21) Appl. No.: 13/729,629

(22) Filed: Dec. 28, 2012

(65) Prior Publication Data
US 2014/0189253 A1 Jul. 3, 2014

(51) Int. Cl.
*G06F 9/38* (2006.01)
*G06F 12/08* (2006.01)

(52) U.S. Cl.
CPC ............ *G06F 9/3834* (2013.01); *G06F 9/3842* (2013.01); *G06F 9/3851* (2013.01); *G06F 9/3863* (2013.01); *G06F 12/0815* (2013.01); *G06F 2212/507* (2013.01)

(58) Field of Classification Search
CPC ............... G06F 12/08; G06F 9/30; G06F 9/38
USPC .......................................... 711/146; 712/225
See application file for complete search history.

(56) References Cited

U.S. PATENT DOCUMENTS

| 8,010,745 B1* | 8/2011 | Favor et al. ................... 711/118 |
| 2009/0182949 A1* | 7/2009 | Begon et al. .................. 711/133 |
| 2009/0210649 A1* | 8/2009 | Wan et al. ..................... 711/170 |

OTHER PUBLICATIONS

J. Gregory Steffan, Christopher B. Colohan, and Todd C. Mowry. 'Extending Cache Coherence to Support Thread-Level Data Speculation on a Single Chip and Beyond.' Dec. 1998. School of Computer Science, Carnegie Mellon University. https://www.cs.cmu.edu/~stampede/papers/tlds_coherence_tr98.pdf.*

* cited by examiner

*Primary Examiner* — Christian P Chace
*Assistant Examiner* — Jane Wei
(74) *Attorney, Agent, or Firm* — Kenyon & Kenyon LLP

(57) ABSTRACT

Responsive to execution of a computer instruction in a current translation window, state indicators associated with a cache line accessed for the execution may be modified. The state indicators may include: a first indicator to indicate whether the computer instruction is a load instruction moved from a subsequent translation window into the current translation window, a second indicator to indicate whether the cache line is modified in a cache responsive to the execution of the computer instruction, a third indicator to indicate whether the cache line is speculatively modified in the cache responsive to the execution of the computer instruction, a fourth indicator to indicate whether the cache line is speculatively loaded by the computer instruction, a fifth indicator to indicate whether a core executing the computer instruction exclusively owns the cache line, and a sixth indicator to indicate whether the cache line is invalid.

18 Claims, 5 Drawing Sheets

| Cacheline State | Non-Speculative Store | Non-Speculative Load | Speculative Store | Speculative Load | Hoisted Load | Commit | Rollback | Eviction | Fill |
|---|---|---|---|---|---|---|---|---|---|
| 310 | 320 | 330 | 340 | 350 | 360 | 370 | 380 | 390 | 395 |
| H 311 | - | - | - | - | set | O = H, reset H | reset | save to OET or Rollback | x |
| M 312 | set | - | set | - | - | - | - | - | x |
| O 313 | - | - | - | set | set | reset | reset | save to OET or Rollback | x |
| E 314 | - | - | - | - | - | - | - | - | x |
| S 315 | - | - | set | - | - | reset | set I bit, reset S | save to SB or Rollback | x |
| I 316 | - | - | - | - | - | - | set I bit, reset S | drop line | reset |

| Cacheline State 310 | Non-Speculative Store 320 | Non-Speculative Load 330 | Speculative Store 340 | Speculative Load 350 | Hoisted Load 360 | Commit 370 | Rollback 380 | Eviction 390 | Fill 395 |
|---|---|---|---|---|---|---|---|---|---|
| H 311 | - | - | - | - | set | O = H, reset H | reset | save to OET or Rollback | x |
| M 312 | set | - | - | - | - | - | - | - | x |
| O 313 | - | - | - | set | set | reset | reset | save to OET or Rollback | x |
| E 314 | - | - | - | - | - | - | - | - | x |
| S 315 | - | - | set | - | - | reset | set I bit, reset S | save to SB or Rollback | x |
| I 316 | - | - | - | - | - | - | set I bit, reset S | drop line | reset |

CACHE COHERENCY AND PROCESSOR CONSISTENCY

FIELD OF THE INVENTION

The present disclosure pertains to the field of processors and, in particular, to cache coherency and processor consistency.

BACKGROUND

Advances in semi-conductor processing and logic design have permitted an increase in the amount of logic that may be present on integrated circuit devices. As a result, computer system configurations have evolved from a single or multiple integrated circuits in a system to multiple cores, multiple hardware threads, and multiple logical processors present on individual integrated circuits. A processor or integrated circuit typically comprises a single physical processor die, where the processor die may include any number of cores, hardware threads, or logical processors. The ever increasing number of processing elements—cores, hardware threads, and logical processors—on integrated circuits enables more tasks to be accomplished in parallel.

In order to fully utilize the ability of computer systems to accomplish tasks in parallel, computer instructions may be reordered and scheduled prior to the execution of the instructions. However, such reordering and scheduling may result in cache coherency and processor consistency violations. Thus, the execution of reordered and scheduled code may need to be checked to ensure that such violations do not occur.

DESCRIPTION OF THE FIGURES

Embodiments are illustrated by way of example and not limitation in the Figures of the accompanying drawings:

FIG. 3 illustrates a table with the states and state transitions of a cache coherence protocol according to an embodiment.

DETAILED DESCRIPTION

Figure 1:
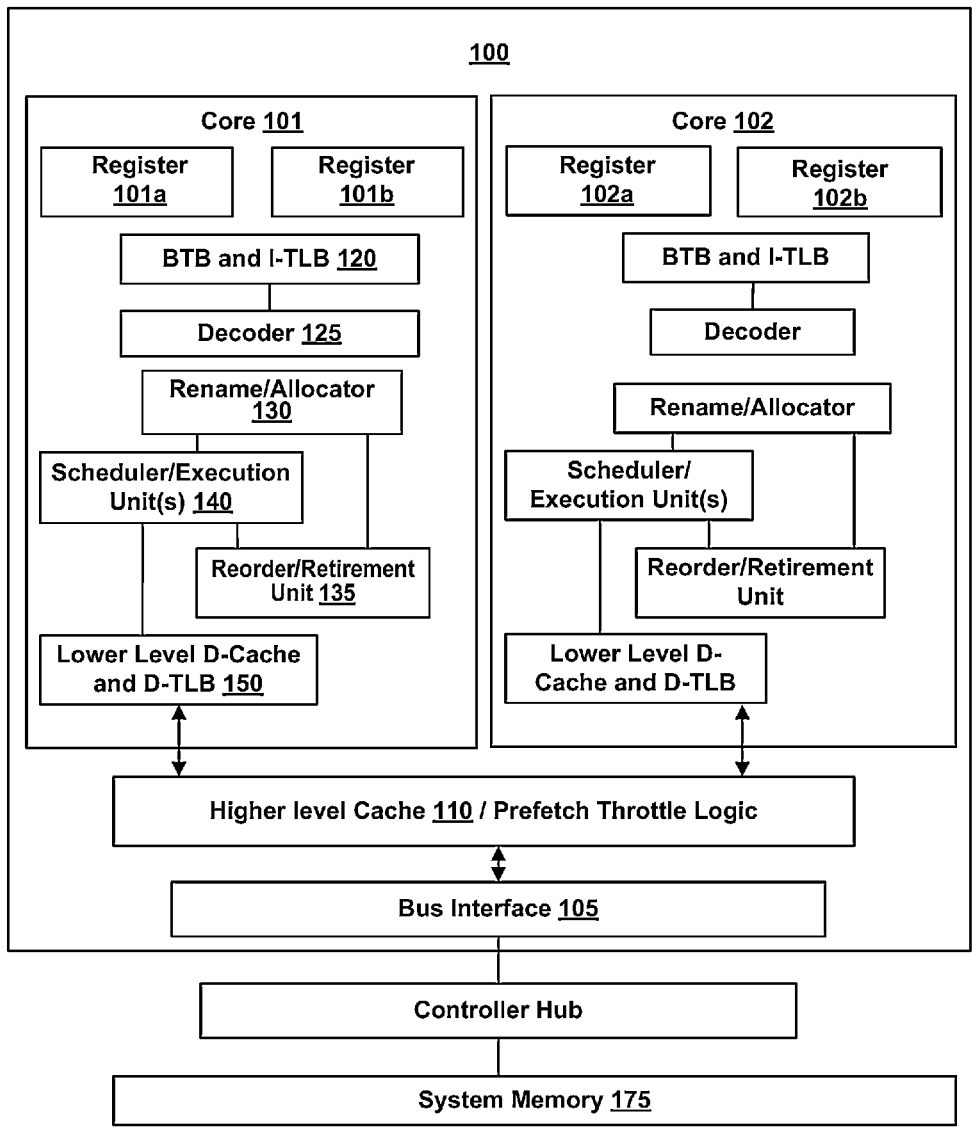
FIG. 1 illustrates a processor including multiple processing elements according to an embodiment.

In the following description, numerous specific details are set forth such as examples of specific hardware structures for storing/caching data, as well as placement of such hardware structures; specific processor units/logic, specific examples of processing elements, etc. in order to provide a thorough understanding of the present invention. It will be apparent, however, to one skilled in the art that these specific details need not be employed to practice the present invention. In other instances, well known components or methods, such as specific counter circuits, alternative multi-core and multi-threaded processor architectures, specific uncore logic, specific memory controller logic, specific cache implementations, specific cache algorithms, and specific operational details of microprocessors, have not been described in detail in order to avoid unnecessarily obscuring the present invention.

Embodiments may be discussed herein which efficiently guarantee cache coherency and processor consistency. In an embodiment, responsive to execution of a computer instruction in a current translation window, one or more state indicators associated with a cache line accessed for the execution may be modified. The state indicators may include: a first indicator to indicate whether the computer instruction is a load instruction moved from a subsequent translation window into the current translation window, a second indicator to indicate whether the cache line is modified in a cache responsive to the execution of the computer instruction, a third indicator to indicate whether the cache line is speculatively modified in the cache responsive to the execution of the computer instruction, a fourth indicator to indicate whether the cache line is speculatively loaded by the computer instruction, a fifth indicator to indicate whether a core executing the computer instruction exclusively owns the cache line, and a sixth indicator to indicate whether the cache line is invalid.

In an embodiment, the first indicator may be set if the computer instruction is moved from the subsequent translation window into the current translation window. The second indicator may be set if the computer instruction is a speculative store or a non-speculative store. The third indicator may be set if the computer instruction is a speculative store. The fourth indicator may be set if the computer instruction is a speculative load. In an embodiment, the first indicator, the third indicator, and/or the fourth indicator may be set. Responsive to a snoop hit, a rollback of the current translation window may be executed. In an embodiment, responsive to a commit of the current translation window, functionality of the first indicator and the fourth indicator may be swapped. In an embodiment, responsive to a commit of the current translation window, if the first indicator is set, the fourth indicator may be set, and the first indicator and the third indicator may be reset. In an embodiment, responsive to a rollback of the current translation window, if the third indicator is set, the sixth indicator may be set, and the first indicator, the third indicator, and the fourth indicator may be reset. In an embodiment, the first indicator, the third indicator, and/or the fourth indicator may be set. Responsive to an eviction of the cache line, a rollback of the current translation window may be executed. In an embodiment, the third indicator may be set. Responsive to an eviction of the cache line, the cache line may be stored in a buffer. In an embodiment, the first indicator and/or the fourth indicator may be set. Responsive to an eviction of the cache line, a memory location associated with the cache line may be stored in a buffer.

Referring to FIG. 1, an embodiment of a processor including multiple cores is illustrated. Processor 100, in one embodiment, includes one or more caches. Processor 100 includes any processor, such as a micro-processor, an embedded processor, a digital signal processor (DSP), a network processor, or other device to execute code. Processor 100, as illustrated, includes a plurality of processing elements.

In one embodiment, a processing element refers to a thread unit, a thread slot, a process unit, a context, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor typically refers to an integrated circuit, which potentially includes any number of other processing elements, such as cores or hardware threads.

A core often refers to logic located on an integrated circuit capable of maintaining an independent architectural state wherein each independently maintained architectural state is associated with at least some dedicated execution resources.

In contrast to cores, a hardware thread typically refers to any logic located on an integrated circuit capable of maintaining an independent architectural state wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 100, as illustrated in FIG. 1, includes two cores, core 101 and 102. Here, core hopping may be utilized to alleviate thermal conditions on one part of a processor. However, hopping from core 101 to 102 may potentially create the same thermal conditions on core 102 that existed on core 101, while incurring the cost of a core hop. Therefore, in one embodiment, processor 100 includes any number of cores that may utilize core hopping. Furthermore, power management hardware included in processor 100 may be capable of placing individual units and/or cores into low power states to save power. Here, in one embodiment, processor 100 provides hardware to assist in low power state selection for these individual units and/or cores.

Although processor 100 may include asymmetric cores, i.e. cores with different configurations, functional units, and/or logic, symmetric cores are illustrated. As a result, core 102, which is illustrated as identical to core 101, will not be discussed in detail to avoid repetitive discussion. In addition, core 101 includes two hardware threads 101a and 101b, while core 102 includes two hardware threads 102a and 102b. Therefore, software entities, such as an operating system, potentially view processor 100 as four separate processors, i.e. four logical processors or processing elements capable of executing four software threads concurrently.

Here, a first thread is associated with architecture state registers 101a, a second thread is associated with architecture state registers 101b, a third thread is associated with architecture state registers 102a, and a fourth thread is associated with architecture state registers 102b. As illustrated, architecture state registers 101a are replicated in architecture state registers 101b, so individual architecture states/contexts are capable of being stored for logical processor 101a and logical processor 101b. Other smaller resources, such as instruction pointers and renaming logic in rename allocater logic 130 may also be replicated for threads 101a and 101b. Some resources, such as re-order buffers in reorder/retirement unit 135, ILTB 120, load/store buffers, and queues may be shared through partitioning. Other resources, such as general purpose internal registers, page-table base register, low level data-cache and data-TLB 115, execution unit(s) 140, and portions of out-of-order unit 135 are potentially fully shared.

Processor 100 often includes other resources, which may be fully shared, shared through partitioning, or dedicated by/to processing elements. In FIG. 1, an embodiment of a purely exemplary processor with illustrative logical units/resources of a processor is illustrated. Note that a processor may include, or omit, any of these functional units, as well as include any other known functional units, logic, or firmware not depicted. As illustrated, processor 100 includes a branch target buffer 120 to predict branches to be executed/taken and an instruction-translation buffer (I-TLB) 120 to store address translation entries for instructions.

Processor 100 further includes decode module 125 is coupled to fetch unit 120 to decode fetched elements. In one embodiment, processor 100 is associated with an Instruction Set Architecture (ISA), which defines/specifies instructions executable on processor 100. Here, often machine code instructions recognized by the ISA include a portion of the instruction referred to as an opcode, which references/specifies an instruction or operation to be performed.

In one example, allocator and renamer block 130 includes an allocator to reserve resources, such as register files to store instruction processing results. However, threads 101a and 101b are potentially capable of out-of-order execution, where allocator and renamer block 130 also reserves other resources, such as reorder buffers to track instruction results. Unit 130 may also include a register renamer to rename program/instruction reference registers to other registers internal to processor 100. Reorder/retirement unit 135 includes components, such as the reorder buffers mentioned above, load buffers, and store buffers, to support out-of-order execution and later in-order retirement of instructions executed out-of-order.

Scheduler and execution unit(s) block 140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 150 are coupled to execution unit(s) 140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

As depicted, cores 101 and 102 share access to higher-level or further-out cache 110, which is to cache recently fetched elements. Note that higher-level or further-out refers to cache levels increasing or getting further way from the execution unit(s). In one embodiment, higher-level cache 110 is a last-level data cache—last cache in the memory hierarchy on processor 100—such as a second or third level data cache. However, higher level cache 110 is not so limited, as it may be associated with or include an instruction cache. A trace cache—a type of instruction cache—instead may be coupled after decoder 125 to store recently decoded traces.

Note, in the depicted configuration that processor 100 also includes bus interface module 105 to communicate with devices external to processor 100, such as system memory 175, a chipset, a northbridge, or other integrated circuit. Memory 175 may be dedicated to processor 100 or shared with other devices in a system. Common examples of types of memory 175 include dynamic random access memory (DRAM), static RAM (SRAM), non-volatile memory (NV memory), and other known storage devices.

Note that in the depicted embodiment, the controller hub and memory are illustrated outside of processor 100. However, the implementations of the methods and apparatus' described herein are not so limited. In fact, as more logic and devices are being integrated on a single die, such as System on a Chip (SOC), each of these devices may be incorporated on processor 100. For example in one embodiment, memory controller hub is on the same package and/or die with processor 100. Here, a portion of the core (an on-core portion) includes a controller hub for interfacing with other devices such as a controller hub. In the SOC environment, even more devices, such as the network interface, co-processors, and any other known computer devices/interface may be integrated on a single die or integrated circuit to provide small form factor with high functionality and low power consumption.

Figure 2:
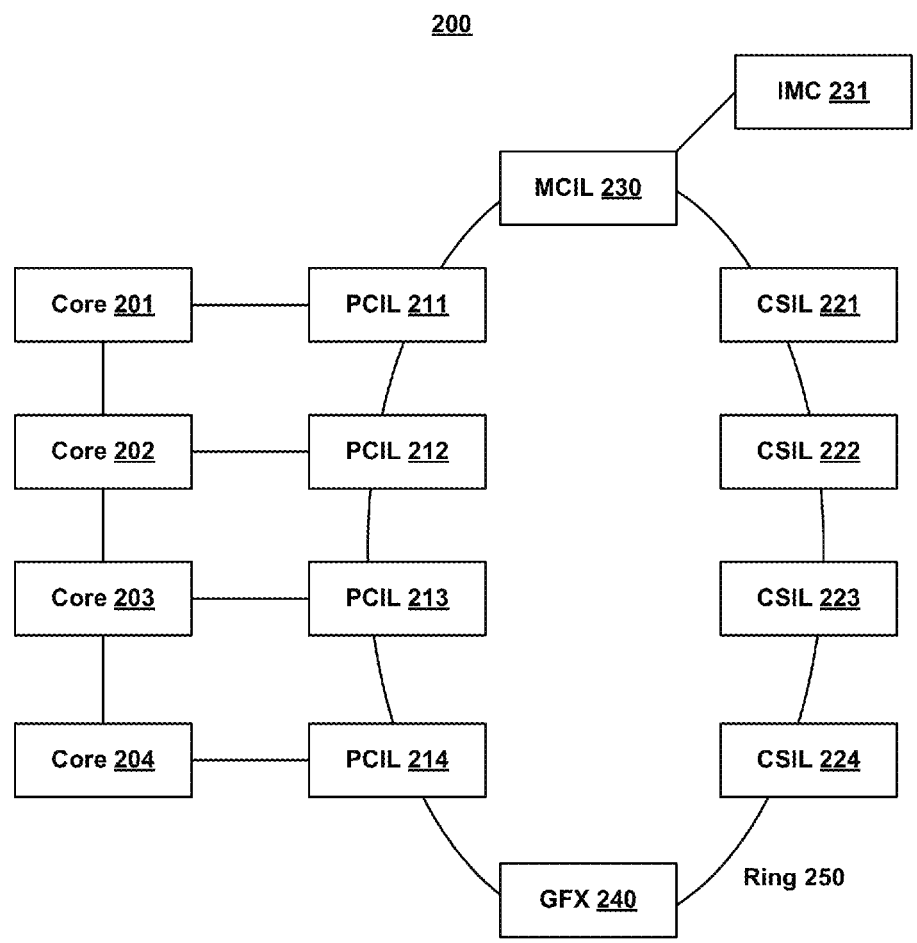
FIG. 2 illustrates on-core memory interface logic according to an embodiment.

FIG. 1 illustrates an abstracted, logical view of an exemplary processor with a representation of different modules, units, and/or logic. However, note that a processor utilizing the methods and apparatus' described herein need not include the illustrated units. And, the processor may omit some or all of the units shown. To illustrate the potential for a different configuration, the discussion now turns to FIG. 2, which depicts an embodiment of processor 200 including an on-processor memory interface module—an uncore module—with a ring configuration to interconnect multiple cores. Processor 200 is illustrated including a physically distributed cache; a ring interconnect; as well as core, cache, and memory controller components. However, this depiction is purely illustrative, as a processor implementing the described methods and apparatus may include any processing elements, style or level of cache, and/or memory, front-side-bus or other interface to communicate with external devices.

In one embodiment, caching agents 221-224 are each to manage a slice of a physically distributed cache. As an example, each cache component, such as component 221, is to manage a slice of a cache for a co-located core—a core the cache agent is associated with for purpose of managing the distributed slice of the cache. As depicted, cache agents 221-224 are referred to as Cache Slice Interface Logic (CSIL)s; they may also be referred to as cache components, agents, or other known logic, units, or modules for interfacing with a cache or slice thereof. Note that the cache may be any level of cache; yet, for this exemplary embodiment, discussion focuses on a last-level cache (LLC) shared by cores 201-204.

Much like cache agents handle traffic on ring interconnect 250 and interface with cache slices, core agents/components 211-214 are to handle traffic and interface with cores 201-204, respectively. As depicted, core agents 221-224 are referred to as Processor Core Interface Logic (PCIL)s; they may also be referred to as core components, agents, or other known logic, units, or modules for interfacing with a processing element Additionally, ring 250 is shown as including Memory Controller Interface Logic (MCIL) 230 and Graphics Hub (GFX) 240 to interface with other modules, such as memory controller (IMC) 231 and a graphics processor (not illustrated). However, ring 250 may include or omit any of the aforementioned modules, as well as include other known processor modules that are not illustrated. Additionally, similar modules may be connected through other known interconnects, such as a point-to-point interconnect or a multi-drop interconnect.

It's important to note that the methods and apparatus' described herein may be implemented in any cache at any cache level, or at any processor or processor level. Furthermore, caches may be organized in any fashion, such as being a physically or logically, centralized or distributed cache.

In computer systems with hardware/software co-designed processors, out-of-order scheduling may be achieved through software. Specifically, the application code in the software layer may be translated into native instruction set architecture (ISA) code. The ISA code may then be reordered and scheduled to improve instruction-level parallelism. In many cases, after reordering, the ISA code may be optimized prior to scheduling.

Reordering and optimization is generally done on portions of code known as translation windows. The code within a translation window may be speculatively executed, and if the speculative execution proceeds without any errors, the changes resulting from the speculative execution are committed. However, if there is an error during the speculative execution, the speculative changes are reverted back (known as rollback). The rolled back code may then be executed sequentially without reordering in order to determine the precise point of error.

In such hardware/software co-designed processors which reorder and optimize code, the conventional cache coherency protocols are insufficient to maintain both cache coherency and processor consistency. Cache coherence refers to the consistency of data stored in multiple caches of a shared resource such as a shared memory multiprocessor system with a separate cache memory for each processor. Processor consistency refers to execution of re-ordered instructions in a manner which produces the same results as execution of the instructions in order.

Specifically, conventional cache coherency protocols are unable to guarantee processor consistency and cache coherency: 1) within the same core, 2) within a multi-core environment, 3) with re-ordered code, and 4) with speculative loading of code from the next translation window into the current translation window.

To address the above, in an embodiment, each cache line in a cache may include state information associated with that particular cache line. This state information may be utilized to ensure processor consistency and cache coherence. FIG. 3 illustrates a table 300 with the states and state transitions of a cache coherence protocol according to an embodiment. As shown in table 300, six possible states 310 which may be associated with a cache line.

A "modified" (M) cache line state 312 indicates whether the information in the associated cache line has been modified by a store operation (regardless of whether the store operation is a non-speculative store operation 320 or a speculative store operation 340). After a commit, cache lines in the modified state 312 have to be written to memory since the corresponding data in memory is stale. In an embodiment, a separate scheduler may perform the writes to memory. In an embodiment, the cache storing a cache line in the M state may respond to snoop requests from other caches. Snooping is a process by which a core monitors accesses by other cores to memory locations that the core has locally cached.

A cache line's state is set to "observed" (O) when the cache line is speculatively loaded 350 within the current translation window. The cache line may be snooped (monitored) by the associated core by checking whether other cores request/modify a copy of the data in the observed cache line. If another core requests a copy of the data, a snoop hit occurs. A snoop hit on an observed cache line means that the data consistency for the observed cache line cannot be guaranteed. For example, it is possible for one of the other cores to modify the data in main memory corresponding to the observed cache line. Next, the core associated with the cache holding the observed cache line may retrieve the updated data from the main memory, resulting in the retrieval of different data for loads to the same memory address within the same translation window. Therefore, when a snoop hit occurs on an observed cache line, a rollback operation 380 may be performed. Upon a commit or a rollback the O state 313 may be reset.

A dynamic code scheduler may move a load operation from the next translation window into the current translation window. This may be referred to as "hoisting" the load operation. When a hoisted load operation is executed, the cache line associated with the hoisted load operation is set to a hoisted (H) state 311. As with an observed cache line, when a snoop hit on a hoisted cache line occurs, a rollback 380 may be performed. Upon a commit 370, the H state 311 of a cache line is copied over to the O state 313, and the H state 311 is reset.

An exclusive (E) cache line state 314 indicates ownership of the cache line within a core. When a cache line is in the E state 314, the core may modify the exclusive cache line without sending snoops to other cores in a multi-core environment.

A "speculative" (S) cache line state 315 indicates whether the information in the associated cache line has been modified by a speculative store operation 340. When a snoop hit on a speculative cache line occurs, a rollback 380 may be performed. If the S state 315 is set and a rollback 380 is performed, the S state 315 is reset, and the cache line is set to an "invalid" (I) state 316. Setting the I state 316 marks the cache line as invalid and invalid cache lines may be overwritten at any time with a valid cache line. On a commit 370, the S state 315 is reset.

The state associated with a cache line in response to retrieving a cache line from memory and loading the cache line into the cache (i.e., a fill operation 395), depends on the operation which lead to the fill operation 395. For example, if a speculative load 350 lead to the fill operation 395, then an O state may be associated with the filled cache line. Similarly, if a speculative store 340 lead to the fill operation 395, then an S state and an M state may be associated with the filled cache line.

In an embodiment the H, M, O, E, S, and/or I states may each be stored as a single bit. For example, a single bit corresponding to a cache line may denote the H state of that cache line. The value "1" may indicate that the cache line is in the H state and the value "0" may indicate that the cache line is not in the H state.

Figure 4:
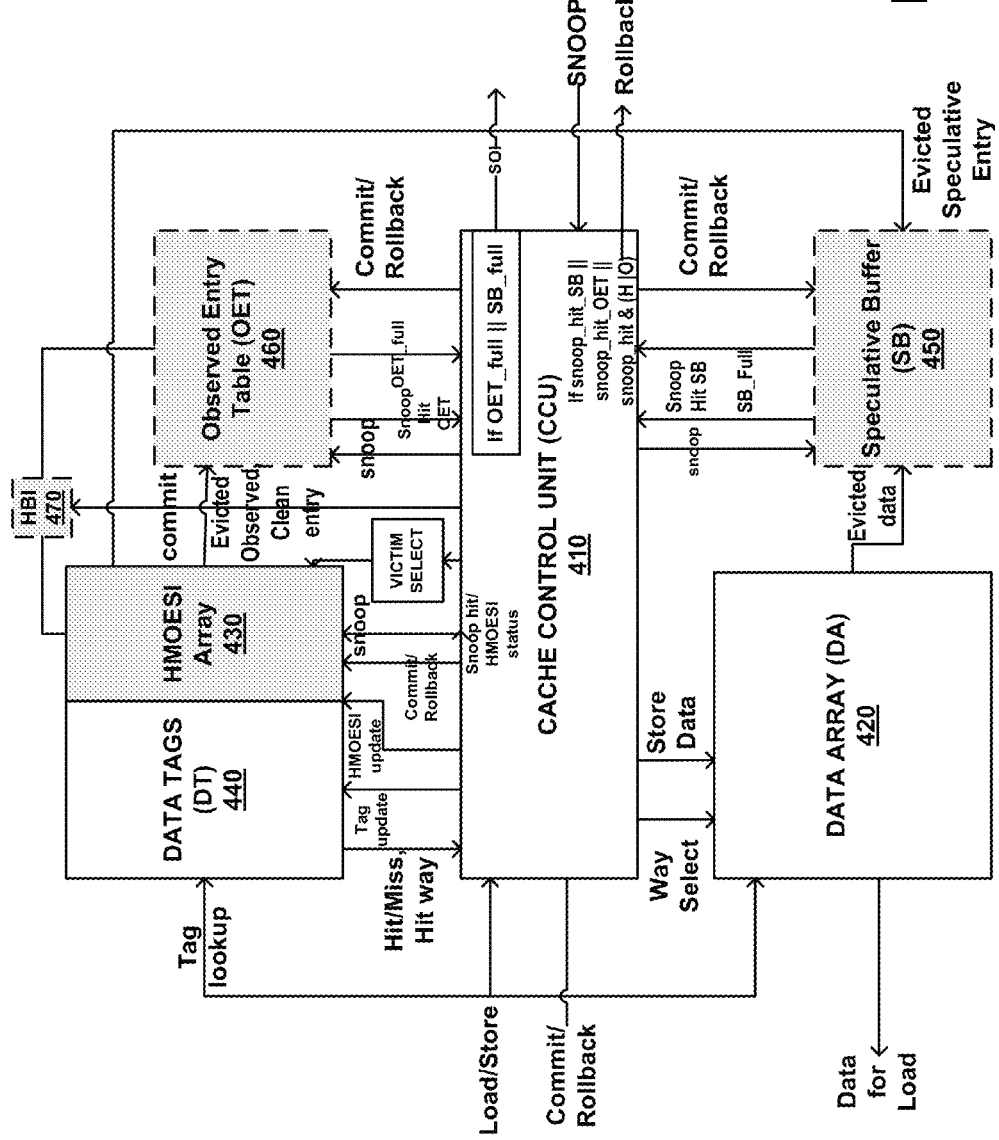
FIG. 4 illustrates the components of a cache according to an embodiment.

FIG. 4 illustrates the components of a cache 400 according to an embodiment. The cache control unit (CCU) may control the functionality of the cache 400. The data array (DA) may store the data that is cached in cache 400. The HMOESI array may include states associated with each cache line in cache 400. Data tags (DT) 440 may include portions of the addresses of the data fetched from memory.

In an embodiment, the cache 400 may include a hoisted bit identifier (HBI) 470. The HBI 470 is a toggle that indicates the location of the H states and O states of the cache lines in cache 400. As described previously, responsive to a commit operation, the H state values of cache lines may be copied over to the respective O states of the cache lines. In an embodiment, to save power, instead of physically copying the H state values to the respective O states, the locations storing the H state values and O state values may be swapped upon each commit operation. The HBI 470 indicates, for the current translation window, which location stores the H state values and which location stores the O state values.

For example, in an embodiment, during the execution of code in a current translation window, a first array may store bits indicating the H state values of the cache lines in cache 400 and a second array may store bits indicating the O state values of the cache lines in cache 400. The HBI 470 may be set to a particular value, for example, 1, which indicates that the first array stores the H bits and the second array stores the O bits. Responsive to a commit, the HBI 470 may be toggled to the value, 0 (zero), which now indicates that the first array stores the O bits. The first array is left unchanged since all the H bits from the previous translation window are O bits in the current translation window. The toggling of the HBI 470 to 0 (zero) also indicates that the second array now stores the H bits. Since a commit resets the H bits, the values in the second array are reset. Any H bits which need to be set responsive to a hoisted load operation within the (new) current translation window, may be set in the second array. Responsive to a another commit, the HBI 470 may be toggled back to the value 1, which indicates that the second array now stores the O bits. The second array is left unchanged since all the H bits from the previous translation window are O bits in the current translation window. The toggling of the HBI 470 to 1 also indicates that the first array now stores the H bits. Since a commit resets the H bits, the values in the second array are reset. The toggling of the HBI 470 may continue as explained above for the subsequent translation windows.

Cache lines stored in cache 400 may be evicted based on a victim selection algorithm when the cache 400 is full. In an embodiment, evicted cache lines may be removed from the current cache hierarchy and written to a higher level of cache hierarchy or the main memory if the evicted cache line is in an M state. The victim selection algorithm chooses and marks the cache lines to be removed. However, due to the atomic nature of the operations within a translation window, not all cache lines chosen as victims may be evicted since a rollback is possible. Specifically, the data tag and state of cache lines in H, O, and/or S states may not be removed from the cache since snoop hits on hoisted, observed, and speculatively modified cache lines should trigger a rollback. If this information is removed during eviction, the system will not be able to perform such rollbacks. In addition, the data tag, data, and state associated with speculatively modified cache lines may not be removed since the current translation window may be committed and upon a commit, the speculatively modified data needs to be written to the main memory. If the speculatively modified cache lines are evicted the data will be lost prior to the commit. Therefore, in an embodiment, if a cache line in a H, O, and/or S state is evicted, the current translation window may be rolled back as seen in table 300 (FIG. 3, column 390).

In another embodiment, the cache 400 may include a speculative buffer 450 to store evicted cache lines in the S state. Instead of rolling back when S state cache lines are evicted, the cache lines may be moved into the speculative buffer 450. The cache lines may be stored in the speculative buffer until a commit or rollback is performed. Responsive to a commit, the S state of the cache lines from the speculative buffer 450 may be reset. Responsive to a snoop, the speculative buffer 450 may be checked for the corresponding cache line. If the cache line is present in the speculative buffer 450 and is in an S state, a rollback may be triggered. If the cache line is present in the speculative buffer 450 and is not in an S state (i.e., a cache line whose S state was previously reset), the cache line may be stored to memory. Responsive to a rollback, the cache lines in the speculative buffer 450 may be invalidated or the speculative buffer 450 may be reset. In an embodiment, if the speculative buffer 450 cannot store any more cache lines, a system interrupt/default may be triggered, resulting in a rollback.

In a further embodiment, the cache 400 may include an observed entry table (OET) 460 to store information associated with evicted cache lines in the H and/or 0 states. Instead of rolling back when H/O state cache lines are evicted, the data tag and the state of the cache lines may be moved into the OET 460. The tag and the H/O state information may be stored in the OET 460 until a commit or rollback is performed. Responsive to a rollback, the entries in the OET 460 may be invalidated (H/O state reset) or the OET 460 may be reset. Responsive to a snoop, the OET 460 may be checked for the corresponding data tag, and if the tag is present in the OET 460, a rollback may be triggered. In an embodiment, if the OET 460 cannot store any more information, a system interrupt/default may be triggered, resulting in a rollback. Responsive to a commit, the H state may be copied to the O state and the H state may be reset.

In an embodiment, the cache 400 may include a speculation overflow interrupt (SOI) to indicate an overflow in either the speculation buffer 450 or the OET 460. In another embodiment, the SOI may indicate that a particular storage threshold in the speculation buffer 450 or the OET 460 has been reached.

Figure 5:
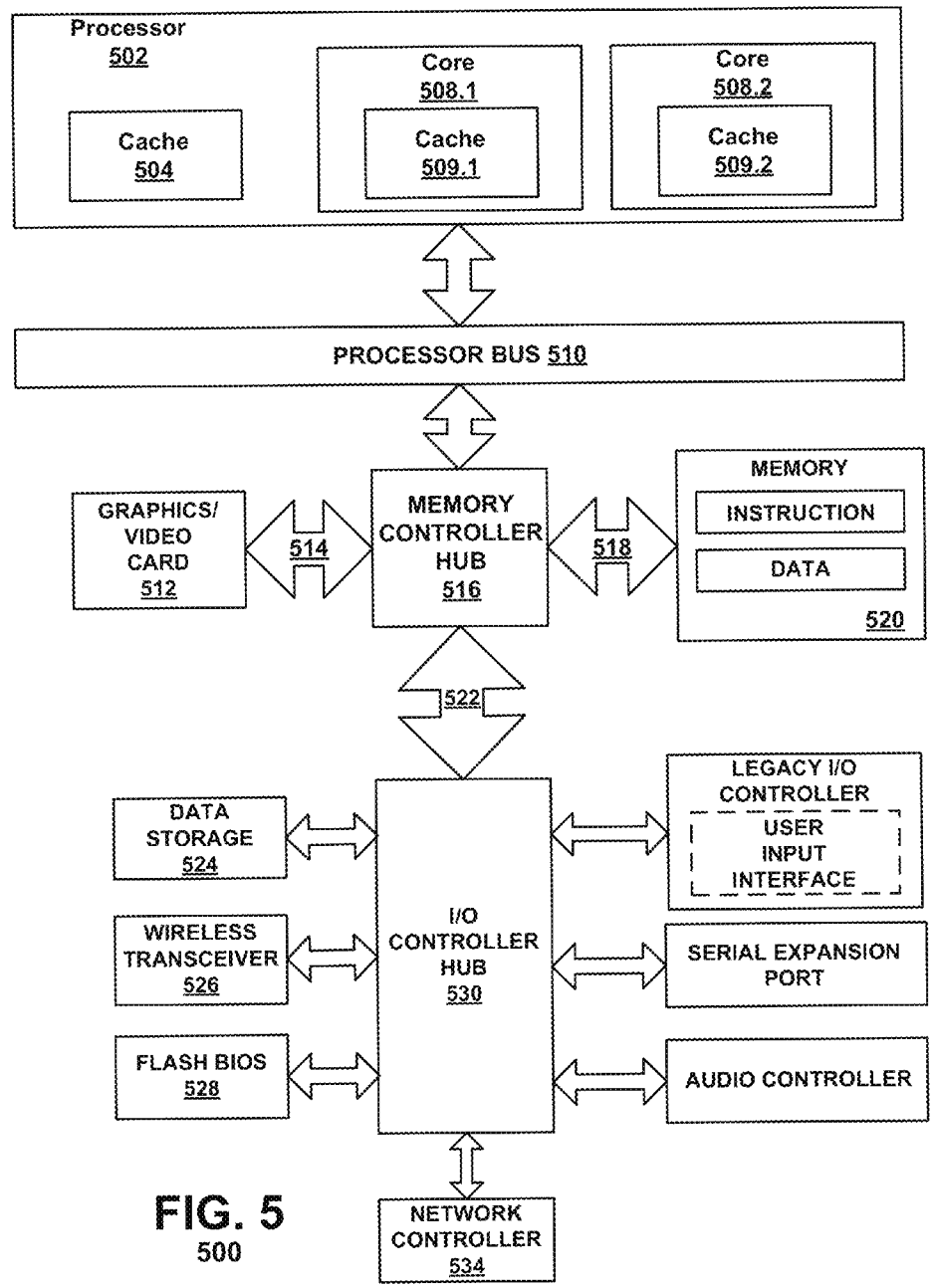
FIG. 5 is a block diagram of an exemplary computer system according to an embodiment.

FIG. 5 is a block diagram of an exemplary computer system 500 formed with a processor 502 that includes one or more cores 508 (e.g., cores 508.1 and 508.2). Each core 508 may execute an instruction in accordance with one embodiment of the present invention. System 500 includes a component, such as a processor 502 to employ execution units including logic to perform algorithms for process data, in accordance with the present invention. System 500 is representative of processing systems based on the PENTIUM® III, PENTIUM® 4, Xeon™, Itanium®, XScale™ and/or StrongARM™ microprocessors available from Intel Corporation of Santa Clara, Calif., although other systems (including PCs having other microprocessors, engineering workstations, set-top boxes and the like) may also be used. In one embodiment, sample system 500 may execute a version of the WINDOWS™ operating system available from Microsoft Corporation of Redmond, Wash., although other operating systems (UNIX and Linux for example), embedded software, and/or graphical user interfaces, may also be used. Thus, embodiments of the present invention are not limited to any specific combination of hardware circuitry and software.

Embodiments are not limited to computer systems. Alternative embodiments of the present invention can be used in other devices such as handheld devices and embedded applications. Some examples of handheld devices include cellular phones, Internet Protocol devices, digital cameras, personal digital assistants (PDAs), and handheld PCs. Embedded applications can include a micro controller, a digital signal processor (DSP), system on a chip, network computers (NetPC), set-top boxes, network hubs, wide area network (WAN) switches, or any other system that can perform one or more instructions in accordance with at least one embodiment.

One embodiment of the system 500 may be described in the context of a single processor desktop or server system, but alternative embodiments can be included in a multiprocessor system. System 500 may be an example of a 'hub' system architecture. The computer system 500 includes a processor 502 to process data signals. The processor 502 can be a complex instruction set computer (CISC) microprocessor, a reduced instruction set computing (RISC) microprocessor, a very long instruction word (VLIW) microprocessor, advanced vector extensions (AVX) microprocessor, streaming single instruction multiple data extensions (SSE) microprocessor, a processor implementing a combination of instruction sets, or any other processor device, such as a digital signal processor, for example. The processor 502 is coupled to a processor bus 510 that can transmit data signals between the processor 502 and other components in the system 500. The elements of system 500 perform their conventional functions that are well known to those familiar with the art.

Depending on the architecture, the processor 502 can have a single internal cache or multiple levels of internal cache. Alternatively, in another embodiment, the cache memory can reside external to the processor 502. Other embodiments can also include a combination of both internal and external caches depending on the particular implementation and needs. In one embodiment, the processor 502 may include a Level 2 (L2) internal cache memory 504 and each core (e.g., 508.1 and 508.2) may include a Level 1 (L1) cache (e.g., 509.1 and 509.2, respectively). In one embodiment, the processor 502 may be implemented in one or more semiconductor chips. When implemented in one chip, all or some of the processor 502's components may be integrated in one semiconductor die.

Each of the core 508.1 and 508.2 may also include respective register files (not shown) that can store different types of data in various registers including integer registers, floating point registers, status registers, and instruction pointer register. Each core 508 may further include logic to perform integer and floating point operations.

The processor 502 also includes a microcode (ucode) ROM that stores microcode for certain macroinstructions. For one embodiment, each core 508 may include logic to handle a packed instruction set (not shown). By including the packed instruction set in the instruction set of a general-purpose processor 502, along with associated circuitry to execute the instructions, the operations used by many multimedia applications may be performed using packed data in a general-purpose processor 502. Thus, many multimedia applications can be accelerated and executed more efficiently by using the full width of a processor's data bus for performing operations on packed data. This can eliminate the need to transfer smaller units of data across the processor's data bus to perform one or more operations one data element at a time.

Alternate embodiments of the processor 502 can also be used in micro controllers, embedded processors, graphics devices, DSPs, and other types of logic circuits. System 500 includes a memory 520. Memory 520 can be a dynamic random access memory (DRAM) device, a static random access memory (SRAM) device, flash memory device, or other memory device. Memory 520 can store instructions and/or data represented by data signals that can be executed by the processor 502.

A system logic chip 516 is coupled to the processor bus 510 and memory 520. The system logic chip 516 in the illustrated embodiment is a memory controller hub (MCH). The processor 502 can communicate to the MCH 516 via a processor bus 510. The MCH 516 provides a high bandwidth memory path 518 to memory 520 for instruction and data storage and for storage of graphics commands, data and textures. The MCH 516 is to direct data signals between the processor 502, memory 520, and other components in the system 500 and to bridge the data signals between processor bus 510, memory 520, and system I/O 522. In some embodiments, the system logic chip 516 can provide a graphics port for coupling to a graphics controller 512. The MCH 516 is coupled to memory 520 through a memory interface 518. The graphics card 512 may be coupled to the MCH 516 through an Accelerated Graphics Port (AGP) interconnect 514.

System 500 uses a proprietary hub interface bus 522 to couple the MCH 516 to the I/O controller hub (ICH) 530. The ICH 530 provides direct connections to some I/O devices via a local I/O bus. The local I/O bus is a high-speed I/O bus for connecting peripherals to the memory 520, chipset, and processor 502. Some examples are the audio controller, firmware hub (flash BIOS) 528, wireless transceiver 526, data storage 524, legacy I/O controller containing user input and keyboard interfaces, a serial expansion port such as Universal Serial Bus (USB), and a network controller 534. The data storage device 524 can comprise a hard disk drive, a floppy disk drive, a CD-ROM device, a flash memory device, or other mass storage device.

For another embodiment of a system, an instruction in accordance with one embodiment can be used with a system on a chip. One embodiment of a system on a chip comprises of a processor and a memory. The memory for one such system is a flash memory. The flash memory can be located on the same die as the processor and other system components. Additionally, other logic blocks such as a memory controller or graphics controller can also be located on a system on a chip.

A value, as used herein, includes any known representation of a number, a state, a logical state, or a binary logical state. Often, the use of logic levels, logic values, or logical values is also referred to as 1s and 0s, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

The embodiments of methods, hardware, software, firmware or code set forth above may be implemented via instructions or code stored on a machine-accessible or machine readable medium which are executable by a processing element. A machine-accessible/readable medium includes any mechanism that provides (i.e., stores and/or transmits) information in a form readable by a machine, such as a computer or electronic system. For example, a machine-accessible medium includes random-access memory (RAM), such as static RAM (SRAM) or dynamic RAM (DRAM); ROM; magnetic or optical storage medium; flash memory devices; electrical storage device, optical storage devices, acoustical storage devices or other form of propagated signal (e.g., carrier waves, infrared signals, digital signals) storage device; etc. For example, a machine may access a storage device through receiving a propagated signal, such as a carrier wave, from a medium capable of holding the information to be transmitted on the propagated signal.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A method comprising:
   responsive to execution of a computer instruction in a current translation window, modifying at least one state indicator associated with a cache line accessed for the execution, wherein the at least one state indicator includes:
   a first indicator to indicate whether the computer instruction is a load instruction moved from a subsequent translation window into the current translation window, the load instruction moved to the current translation window being speculatively executed,
   a second indicator to indicate whether the cache line is modified in a cache responsive to the execution of the computer instruction,
   a third indicator to indicate whether the cache line is speculatively modified in the cache responsive to the execution of the computer instruction,
   a fourth indicator to indicate whether the cache line is speculatively loaded by the computer instruction,
   a fifth indicator to indicate whether a core executing the computer instruction exclusively owns the cache line,
   a sixth indicator to indicate whether the cache line is invalid, and
   responsive to a commit of the current translation window, swapping the functionality of the first indicator and the fourth indicator.

2. The method of claim 1, wherein the modifying includes:
   setting the first indicator if the computer instruction is moved from the subsequent translation window into the current translation window,
   setting the second indicator if the computer instruction is one of a speculative store and a non-speculative store,
   setting the third indicator if the computer instruction is a speculative store, and
   setting the fourth indicator if the computer instruction is a speculative load.

3. The method of claim 1, wherein at least one of the first indicator, the third indicator, and the fourth indicator is set, and the method further comprises:
   responsive to a snoop hit, executing a rollback of the current translation window.

4. The method of claim 1, further comprising:
   responsive to a commit of the current translation window:
   if the first indicator is set, setting the fourth indicator, and
   resetting the first indicator and the third indicator.

5. The method of claim 1, further comprising:
   responsive to a rollback of the current translation window:
   if the third indicator is set, setting the sixth indicator, and
   resetting the first indicator, the third indicator, and the fourth indicator.

6. The method of claim 1, wherein at least one of the first indicator, the third indicator, and the fourth indicator is set, and the method further comprises:
   responsive to an eviction of the cache line, executing a rollback of the current translation window.

7. The method of claim 1, wherein the third indicator is set, and the method further comprises:
   responsive to an eviction of the cache line, storing the cache line in a buffer.

8. The method of claim 1, wherein at least one of the first indicator and the fourth indicator is set, and the method further comprises:
   responsive to an eviction of the cache line, storing a memory location associated with the cache line in a buffer.

9. An apparatus comprising:
   a processor to execute computer instructions, wherein the processor is configured to:

responsive to execution of a computer instruction in a current translation window, modify at least one state indicator associated with a cache line accessed for the execution, wherein the at least one state indicator includes:
- a first indicator to indicate whether the computer instruction is a load instruction moved from a subsequent translation window into the current translation window, the load instruction moved to the current translation window being speculatively executed,
- a second indicator to indicate whether the cache line is modified in a cache responsive to the execution of the computer instruction,
- a third indicator to indicate whether the cache line is speculatively modified in the cache responsive to the execution of the computer instruction,
- a fourth indicator to indicate whether the cache line is speculatively loaded by the computer instruction,
- a fifth indicator to indicate whether a core executing the computer instruction exclusively owns the cache line,
- a sixth indicator to indicate whether the cache line is invalid, and responsive to a commit of the current translation window, swap the functionality of the first indicator and the fourth indicator.

10. The apparatus of claim 9, wherein the processor is further configured to:
- set the first indicator if the computer instruction is moved from the subsequent translation window into the current translation window,
- set the second indicator if the computer instruction is one of a speculative store and a non-speculative store,
- set the third indicator if the computer instruction is a speculative store, and
- set the fourth indicator if the computer instruction is a speculative load.

11. The apparatus of claim 9, wherein at least one of the first indicator, the third indicator, and the fourth indicator is set, and the processor is further configured to:
- responsive to a snoop hit, execute a rollback of the current translation window.

12. The apparatus of claim 9, wherein the processor is further configured to:
- responsive to a commit of the current translation window: if the first indicator is set, set the fourth indicator, and reset the first indicator and the third indicator.

13. The apparatus of claim 9, wherein the processor is further configured to:
- responsive to a rollback of the current translation window: if the third indicator is set, set the sixth indicator, and reset the first indicator, the third indicator, and the fourth indicator.

14. The apparatus of claim 9, wherein at least one of the first indicator, the third indicator, and the fourth indicator is set, and wherein the processor is further configured to:
- responsive to an eviction of the cache line, execute a rollback of the current translation window.

15. The apparatus of claim 9, wherein the third indicator is set, and the processor is further configured to:
- responsive to an eviction of the cache line, store the cache line in a buffer.

16. The apparatus of claim 9, wherein at least one of the first indicator and the fourth indicator is set, and the processor is further configured to:
- responsive to an eviction of the cache line, store a memory location associated with the cache line in a buffer.

17. A non-transitory machine-readable medium having stored thereon an instruction, which if performed by a machine causes the machine to perform a method comprising:
responsive to execution of a computer instruction in a current translation window, modifying at least one state indicator associated with a cache line accessed for the execution, wherein the at least one state indicator includes:
- a first indicator to indicate whether the computer instruction is a load instruction moved from a subsequent translation window into the current translation window, the load instruction moved to the current translation window being speculatively executed,
- a second indicator to indicate whether the cache line is modified in a cache responsive to the execution of the computer instruction,
- a third indicator to indicate whether the cache line is speculatively modified in the cache responsive to the execution of the computer instruction,
- a fourth indicator to indicate whether the cache line is speculatively loaded by the computer instruction,
- a fifth indicator to indicate whether a core executing the computer instruction exclusively owns the cache line, and
- a sixth indicator to indicate whether the cache line is invalid, and responsive to a commit of the current translation window, swapping the functionality of the first indicator and the fourth indicator.

18. The machine-readable medium of claim 17, wherein the modifying includes:
- setting the first indicator if the computer instruction is moved from the subsequent translation window into the current translation window,
- setting the second indicator if the computer instruction is one of a speculative store and a non-speculative store,
- setting the third indicator if the computer instruction is a speculative store, and
- setting the fourth indicator if the computer instruction is a speculative load.

* * * * *